(12) United States Patent
Barthel et al.

(10) Patent No.: US 8,345,539 B2
(45) Date of Patent: Jan. 1, 2013

(54) ADDRESSING OF REDUNDANT SUBSCRIBERS IN A COMMUNICATION NETWORK

(75) Inventors: Herbert Barthel, Herzogenaurach (DE); Joachim Feld, Nürnberg (DE); Günter Steindl, Poppenricht (DE); Karl Weber, Altdorf (DE)

(73) Assignee: Siemens Aktiengesellschaft, München (DE)

( * ) Notice: Subject to any disclaimer, the term of this patent is extended or adjusted under 35 U.S.C. 154(b) by 2210 days.

(21) Appl. No.: 11/035,720

(22) Filed: Jan. 15, 2005

(65) Prior Publication Data

US 2005/0163043 A1  Jul. 28, 2005

(30) Foreign Application Priority Data

Jan. 23, 2004  (EP) .................................. 04001488

(51) Int. Cl.
  *G01R 31/08*  (2006.01)
(52) U.S. Cl. ........................ 370/218; 370/245
(58) Field of Classification Search .............. 370/219, 370/217, 220, 351, 241; 709/239, 242
  See application file for complete search history.

(56) References Cited

U.S. PATENT DOCUMENTS

| 5,473,599 | A | 12/1995 | Li et al. |
| 6,392,990 | B1 | 5/2002 | Tosey et al. |
| 7,227,838 | B1 * | 6/2007 | O'Riordan ............... 370/219 |
| 2003/0093557 | A1 * | 5/2003 | Giraud et al. ............ 709/239 |
| 2005/0025179 | A1 * | 2/2005 | McLaggan et al. ...... 370/468 |
| 2005/0111352 | A1 * | 5/2005 | Ho et al. ................. 370/219 |

FOREIGN PATENT DOCUMENTS

| DE | 101 60 699 A1 | 7/2002 |
| EP | 1 379 038 A1 | 1/2004 |

OTHER PUBLICATIONS

S. Knight, D. Weaver, D. Whipple, R. Hinden, D. Mitzel, P. Hunt, P. Higginson, M. Shand and A. Lindem, "Virtual Router Protocol", Network Working Group, Apr. 1998, pp. 1-27, XP-002135272.
T. Li, B. Cole, P. Morton and D. Li, "Cisco Hot Standby Router Protocol (HSRP)", Network Working Group, Mar. 1998, pp. 1-17, XP-002198799.

* cited by examiner

*Primary Examiner* — David Oveissi

(57) ABSTRACT

A system and a method are provided for addressing at least two subscribers that are redundant in respect of each other in a communication network. The subscribers are each permanently assigned a unique address which is different for each subscriber. The subscribers form a group such that the subscribers in the group are redundant in respect to each other. The group of subscribers is assigned a unique group address which is only activate for one of the subscribers in the group and de-active for each of the remaining subscribers in the group. At least one higher-order unit is provided for the activation and deactivation.

10 Claims, 2 Drawing Sheets

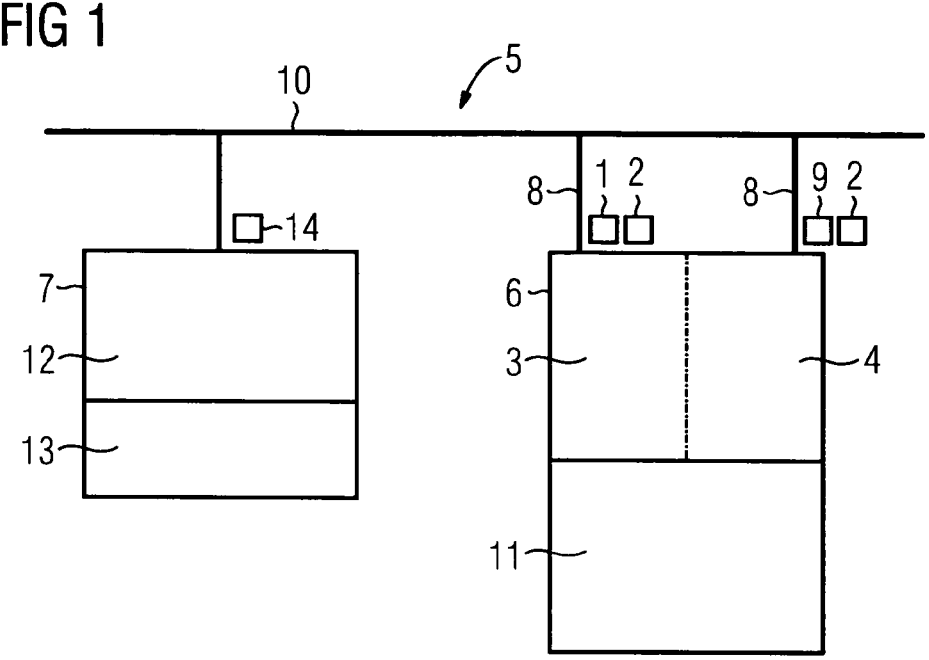
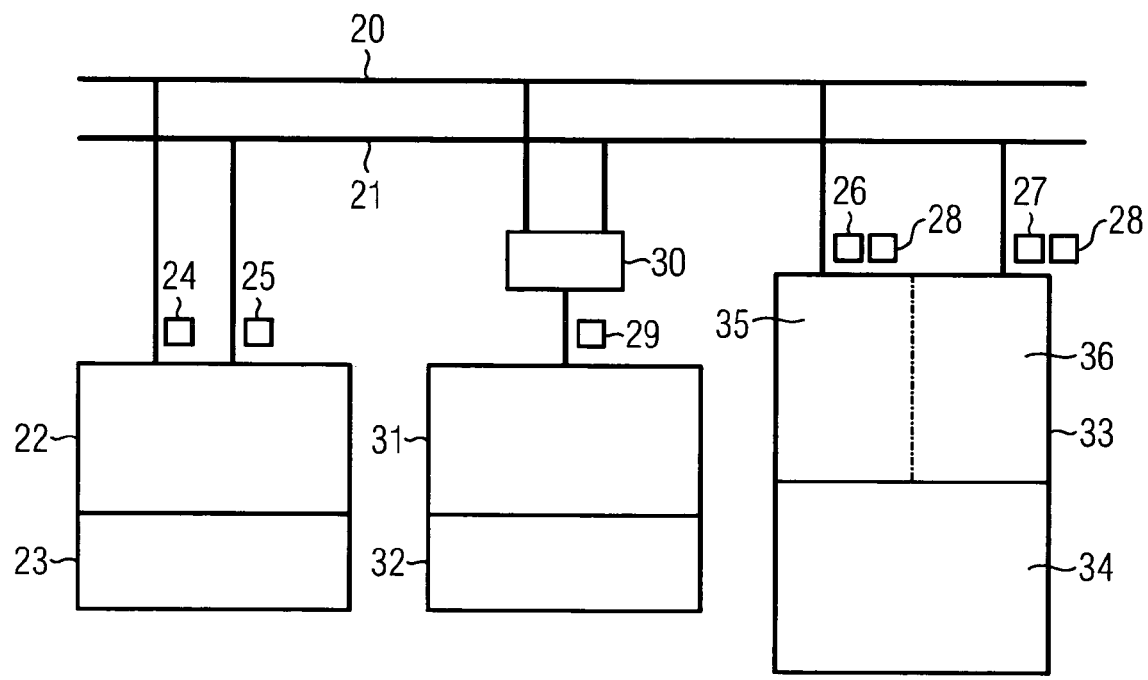

ADDRESSING OF REDUNDANT SUBSCRIBERS IN A COMMUNICATION NETWORK

CROSS REFERENCE TO RELATED APPLICATIONS

This application claims priority to the European application No. 04001488.8, filed Jan. 23, 2004 and which is incorporated by reference herein in its entirety.

FIELD OF INVENTION

The invention relates to a system and a method for addressing at least two subscribers that are redundant in respect of each other in a communication network, with the subscribers being permanently assigned a physical address that is unique in the communication network.

BACKGROUND OF INVENTION

A method for processing errors in interface components of a network is known from U.S. Pat. No. 6,392,990 B1. The method is intended for operation on a computer in a network with a plurality of computers, with the computers having interface units that are redundant in respect of each other and are connected by means of redundant cables. The method ensures transparent recovery after network errors by providing an address list for the computers in the network. The computer periodically tests the communication connections to one or a plurality of the other computers until it receives a response from at least one computer in the form of said computer's network address. The computer then uses the network address of the other computer to monitor the communication connection to said computer, until in some instances the other computer no longer responds. In the event that it receives no response, the computer allocates the network address of the other computer to the redundant interface unit.

SUMMARY OF INVENTION

The object of the invention is to increase the availability of communication connections within a communication network.

This object is achieved by a system for addressing at least two subscribers that are redundant in respect of each other in a communication network, whereby the subscribers are each permanently assigned a first physical address that is unique in the communication network and a group subscribers that are redundant in respect of each other are each assigned a second physical address that is unique in the communication network, whereby the second address assigned to a group can be activated and deactivated as the valid address in the communication network for the redundant subscribers in the group respectively, whereby at least one higher-order or superordinate unit is provided respectively at one time to activate the second address for just one of the redundant subscribers in the group and to deactivate the second address for the remaining redundant subscribers in the group. The system is used for addressing at least two subscribers that are redundant in respect of each other in a communication network, with each subscriber being permanently assigned a first physical address that is unique in the communication network and each of a group of subscribers that are redundant in respect of each other being assigned a second physical address that is unique in the communication network, whereby the second address assigned to a group can be activated and deactivated as the valid address in the communication network for the redundant subscribers in the group, whereby at least one higher-order unit is provided respectively at one time to activate the second address for just one subscriber in the redundant subscriber group and to deactivate the second address for the remaining redundant subscribers in the group.

The object is achieved by a method for addressing at least two subscribers that are redundant in respect of each other in a communication network, whereby the subscribers are each permanently assigned a first physical address that is unique in the communication network and a group of subscribers that are redundant in respect of each other are each assigned a second physical address that is unique in the communication network, whereby the second address assigned to a group can be activated and deactivated as the valid address in the communication network for the redundant subscribers in the group respectively, whereby at least one higher-order unit activates the second address for just one of the redundant subscribers in the group and deactivates the second address for the remaining redundant subscribers in the group. With the method for addressing at least two subscribers that are redundant in respect of each other in a communication network, each of the subscribers is permanently assigned a first physical address that is unique in the communication network and a group of subscribers that are redundant in respect of each other are each assigned a second physical address that is unique in the communication network, whereby the second address assigned to a group can be activated and deactivated as the valid address in the communication network respectively for the redundant subscribers in the group, whereby at least one higher-order unit activates the second address for just one of the redundant subscribers in the group and deactivates the second address respectively for the remaining redundant subscribers in the group.

To increase communication availability communication buses are frequently designed to be highly available. This is achieved for example by setting up a communication ring or by doubling communication lines. In order to manage not only failure of the communication link but also failure of a communication unit, in many cases the communication unit is also made to be redundant as this is the next weak point in the highly available communication bus. It has to be possible to address function units, e.g. redundant control units or peripheral units with a redundant communication unit, which are connected to a communication bus (line or ring) or to a redundant communication bus. There are two opposing requirements for this; for all functions for which redundancy is to be hidden, the function unit should only be given one address. Such functions include for example the interfacing of process peripherals linked by-a single channel. This address should be switchable. For all functions for which redundancy is to be disclosed, the function unit or its communication unit should be given as many addresses as there are redundant components in the redundant unit. This allows user-specific diagnosis, as for example in the event of an error the respective address of the component involved can be uniquely specified. The same requirement applies to maintenance and for future functions. It is not the common features of the redundant components which are of interest here but specifically the status data of the individual components. The redundant communication unit can generally be n-channel ($n>1$).

The present invention satisfies the two apparently contradictory requirements described above. The subscribers in the communication network or communication subscribers described here are communication units and in some instances their sub-units.

According to an advantageous embodiment of the invention the higher-order unit is provided to identify failure of communication links to the subscribers and to identify failure of the subscribers. The communication functionality is therefore monitored by the higher-order communication unit (or partner unit).

If the higher-order unit discloses the failure of the preferred channel, it can prompt the sub-unit of the redundant communication unit currently operating as reserve to switch or take over the switched address. Advantageously the higher-order unit is thereby provided to select a preferred communication link from the communication links to subscribers assigned to a group. A group of subscribers that are redundant in respect of each other is hereafter referred to as a redundancy group. Each individual redundant sub-unit has two addresses. A first address is assigned permanently to each sub-unit. The other sub-address is the second, so-called switchable address. The switchable address is activated for the preferred channel and deactivated for all the redundant channels belonging to this redundancy group. If the preferred channel fails, the switchable address is actively switched on the reserve channel. The common functionality of the group can be achieved via the switchable address.

According to a further advantageous embodiment of the invention the system for addressing at least two subscribers that are redundant in respect of each other in a communication network is part of an industrial automation system. For all functions, in which allocation to the redundant channels or redundant communication units is of no relevance, the component behaves like a single-channel component. These functions include for example reading/writing process data and process alarms. For these functions the redundant network component behaves like a single component both at the communication ring and at the redundant communication bus. This has the advantage that redundancy remains hidden. In automation technology the objective is that a partner component, which only processes process data or process alarms from the redundant peripheral unit, does not have to be concerned with redundancy. If the preferred channel sub-unit fails, the lower order communication system, e.g. Ethernet, automatically repeats the communication request and as the switchable address on the other side responds, communication now operates via the former standby channel without the single-channel communication unit itself having to be active. Only the function units which have to address the individual sub-units (e.g. for diagnosis and maintenance) have to know about the redundancy, in that they know the addresses of the sub-units. This has the advantage that all the necessary information for repair and maintenance (e.g. locally correct data of the sub-units) can be read and written with the same means as with single-channel components. From their point of view this also has the advantage that the redundancy remains hidden.

In order to achieve simple automatic addressing—particularly when powering the system up—according to a further advantageous embodiment of the invention one of the redundant subscribers in a group activates a third physical address that is unique in the communication network and assigned to them as the second address assigned to the respective group and valid in the communication network and the remaining redundant subscribers in the group deactivate the second address.

BRIEF DESCRIPTION OF THE DRAWINGS

The invention is described and explained below with reference to the exemplary embodiments shown in the Figures, in which:

FIG. 1 shows a system for addressing two subscribers that are redundant in respect of each other in a communication network, FIG. 2 shows a system with subscribers that are redundant in respect of each other in a communication network with a redundantly configured communication bus.

DETAILED DESCRIPTION OF INVENTION

Figure 3:
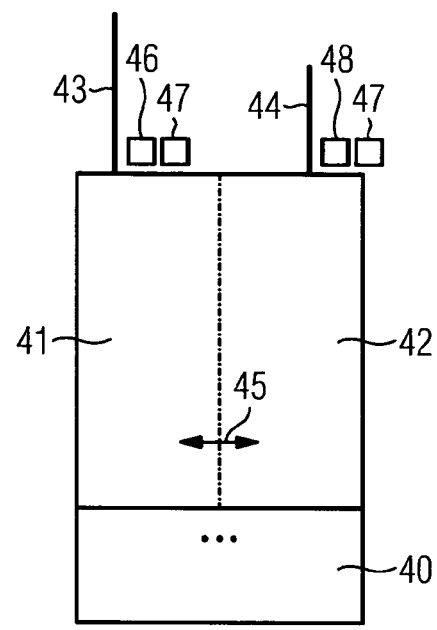
FIG. 3 shows a communication unit with two redundant sub-units and FIG. 4 shows a system for addressing subscribers that are redundant in respect of each other in a communication network to clarify the communication relationships within the system.

FIG. 1 shows a system for addressing two subscribers 3, 4 that are redundant in respect of each other in a communication network 5. The subscribers 3, 4 in the exemplary embodiment according to FIG. 1 are communication units of a function unit 11 that are redundant in respect of each other. The subscribers 3, 4 that are redundant in respect of each other form a group 6. The redundant subscribers 3, 4 can communicate via a communication bus 10 in the communication network 5. A higher-order unit 7 is connected to the communication bus 10 and comprises a communication unit 12 and a function unit 13. Different communication links 8 are available for communication purposes. The first redundant subscriber 3 is permanently assigned a physical address 1 that is unique in the communication network 5. The second redundant subscriber 4 is permanently assigned another physical address 9 that is unique in the communication network 5. The group 6 of subscribers 3, 4 that are redundant in respect of each other is assigned a further physical address 2 that is unique in the communication network 5, which can be activated and deactivated as the valid address in the communication network 5 for each of the two redundant subscribers 3, 4 in the group 6. In the exemplary embodiment according to FIG. 1, said activation and deactivation takes place on the initiative of the higher-order unit 7. The higher-order unit 7 thereby allocates the further address 2 to just one of the two redundant subscribers 3, 4, i.e. activates said address 2 for the respective subscriber 3, 4. Conversely the higher-order function unit 7 deactivates said address 2 for the respective other subscriber 3, 4. Such assignment of physical addresses 1, 2, 9 means that the subscribers 3, 4 that are redundant in respect of each other can both be addressed or contacted individually and uniquely by means of their respective first address 1, 9 and can also be addressed as a group 6 by means of the physical address 2. The physical address 2 is thereby assigned to one of the two communication channels formed by the redundant subscribers 3, 4 and the respective bus segments as the preferred channel. The respective other communication channel is maintained as the reserve channel. The communication functionality is monitored by the higher-order unit 7. If the higher-order unit 7 discloses the failure or disruption of communication with the preferred channel, it prompts the subscriber 3 or 4 of the group currently operating as the reserve to switch or take over the so-called switched address 2.

In the case of hitherto known systems with the units that are redundant in respect of each other, either just a single identical address is provided for the two units or just one address for the preferred channel and one address for the standby channel. If the preferred channel fails, the sub-communication unit, which was hitherto the standby channel, then takes over the preferred channel and the address of the preferred channel as quickly as possible. From the user's point of view however the entire communication unit thereby changes address. With both hitherto known methods it is not however possible reasonably to resolve the requirement that it should be possible to address each of the redundant units in the network uniquely. With the known methods according to the prior art, diagnosis and maintenance tools therefore do not know with which of the communication units that are redundant in respect of each other they are communicating.

FIG. 2 shows a further exemplary embodiment of a system for addressing two subscribers that are redundant in respect of each other in a communication network with a redundant bus system. Communication units 22, 31, 33 are linked together via redundant communication links 20, 21, e.g. communication buses. The communication units 22, 31, 33 carry out communication tasks for function units 23, 32, 34. The communication unit 33 for the function unit 34 is a redundant communication unit, containing two sub-units 35 and 36 that are redundant in respect of each other. The communication unit 22 of the higher-order function unit 23 is also configured as a redundant higher-order communication unit. A further communication subscriber is the single-channel function unit 32, which communicates via the single-channel communication unit 31.

A permanent physical address that is unique in the communication network is assigned to each of the communication units 22, 31 and the sub-units 35, 36. In the exemplary embodiment according to FIG. 2 this physical address is in the form of a so-called MAC address 24, 25, 26 or 27 (MAC=Media Access Control). A MAC address refers to an ID number of a subscriber in a communication network, which is usually represented by 48 bit hexadecimal figures and generally cannot be changed. The MAC address is a hardware address, which is used to identify a node in the network uniquely. According to the OSI reference model (OSI=Open System Interconnection), which is referred to as the 7-layer model, the second layer, the so-called data backup layer is divided into two sub-layers with the MAC layer as the lower layer. The MAC layer is used to organize the bit transmission layer into logical information groups, or frames, as well as to detect errors, to control the data flow and to identify the computers in the network. An additional address 28 is now introduced for the redundant sub-units 35, 36. This means that each of the sub-units 35, 36 is given two addresses. The respective first address 26, 27 is assigned permanently to the respective sub-unit 35 or 36, while the other address 28 is the so-called switchable address. The switchable address 28 is activated for the preferred channel and deactivated for the reserve channel. If the preferred channel or communication link 20 or 21 fails, the second address 28 is activated on the reserve channel. The common functionality of the function unit 34 can be achieved by means of the second address 28.

One possible implementation at MAC address level is as follows: Each of the two sub-units 35, 36 contains two MAC addresses 26, 27 or 28 that are unique worldwide. The sub-unit 35, 36, which is first operational when the system is first switched on, automatically activates both of its addresses 26, 27 or 28—one address as the permanently assigned address 26 or 27 and the other address as the so-called switched address 28. The sub-unit 35, 36, which starts next, activates only the address 26 or 27 assigned to it permanently. Said sub-unit 35, 36 leaves the so-called switched address 28 inactive. The sub-unit 35, 36 then however prepares to take over the switched MAC address 28 of the other sub-unit 35, 36, if said other sub-unit 35, 36 fails.

In the exemplary embodiment according to FIG. 2, the higher-order communication unit 22 is configured in a redundant manner, in other words it can be contacted via the communication link 20 by means of the address 24 or via the communication link 21 by means of the address 25. The higher-order communication unit 22 has the task of monitoring communication with the redundant communication unit 33. This monitoring operation applies both to the preferred channel (primary) and the reserve channel. If the reserve channel fails (either due to failure of the bus connection or failure of the respective reserve sub-unit 35 or 36) said failure is reported to a higher-order master system. If the preferred channel fails, a message is sent by the higher-order function unit 23 to the respective reserve unit 35 or 36 to become the preferred channel. This sub-unit 35, 36 maintains its permanent address 26 or 27 and activates the switched address 28 for the preferred channel. The former preferred channel is requested both via the internal connection and by the higher-order communication unit 22 to deactivate its preferred channel address 28 (if it has not already failed and is therefore no longer active for communication purposes).

The switchable address is assigned for example using one of the two methods described below:

In the case of the first proposed method, the higher-order communication unit 22 manages the switchable addresses and assigns them to a redundant group on each first activation. One address 26, 27 is factory set on each of the sub-units 35, 36; the other address 28 is 0 or inactive. The second address 28 is not used until the sub-unit 35, 36 is first used in a redundant group. In the case of the second proposed method, each sub-unit 35, 36 of the communication unit 33 belonging to the redundancy group has two factory-set worldwide unique addresses. For example sub-unit 35 is given the addresses "a+x" and sub-unit 36 the addresses "b+y". When the two sub-units 35, 36 that are redundant in respect of each other are switched on, the sub-unit 35 powered up first activates its switchable address "x". The sub-unit 36 powered up next rejects its switchable address "y" and takes over the address "x" as its switchable address.

Diagnosis and maintenance tools are generally set up like the single-channel function unit 32 with a single-channel communication unit 31. The single-channel communication unit 31 is in turn assigned a permanent physical address 29. The communication unit 31 communicates via a switch 30 with the redundant communication links 20 and 21. Diagnosis and maintenance tools know both addresses 26, 27 of the redundant communication unit 33, as it is an objective of diagnosis and maintenance to diagnose individual interchangeable sub-units 35, 36. In the event of a communication request, the respective hardware unit has to be contacted separately, which is possible with the proposed addressing mechanisms.

FIG. 3 shows an exemplary embodiment of a function unit 40 with a redundant communication unit, comprising two sub-units 41 and 42. The sub-units 41 and 42 communicate via communication connections 43 and 44 with further subscribers (not shown here) in a communication network. The sub-units 41, 42 can be addressed via physical addresses 46, 47, 48. There is also an internal communication connection 45 between the two sub-units 41 and 42. As the described address switch does not take place via the internal communication connection 45 but via the external communication connections 43, 44, failure of the internal communication connection 45 on the one hand can be managed and failure of the external communication connections 43, 44 on the other hand can also be identified and managed.

Figure 4:
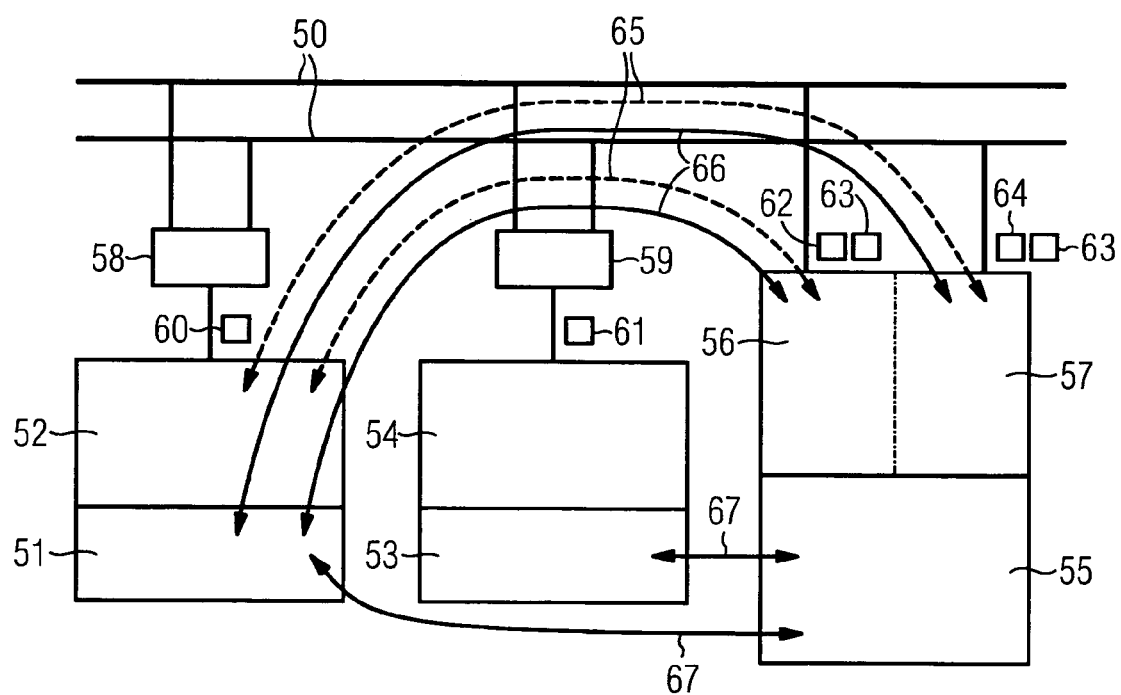

FIG. 4 serves to clarify the communication relationships within a system for addressing subscribers that are redundant in respect of each other in a communication network. It shows a function unit 55 with a communication unit comprising two sub-units 56, 57, a single-channel communication unit 53 with a single-channel communication unit 54 and a higher-order function unit 51 with a higher-order communication unit 52. The higher-order communication unit 52 can be addressed by means of the address 60 and communicates via a switch 58 with the redundant communication bus 50. The single-channel communication unit 54 can be addressed by means of the address 61 and communicates via the switch 59 with the redundant communication bus 50. The sub-units 56, 57 of the redundant communication unit also communicate via the redundant communication bus 50 and can be addressed by means of the addresses 62, 63 or 64.

The arrows marked with the reference character 67 represent the majority of communication relationships within the system shown. Process data and process alarms for example are exchanged via these communication relationships. These communication relationships operate in relation to the redundant communication unit with the switched address 63 and are in this respect identical to a communication relationship with a single-channel device. The arrows marked with the reference character 66 represent the communication relationships for maintenance and diagnosis with the sub-units 56, 57 of the communication unit. There are also communication relationships (not shown here) with the function unit 55. The communication relationships marked with the reference character 65 represent the functions required for communication monitoring and for requesting a switch on identification of an error on the preferred channel. These communication relationships are also used to identify and report communication failure on the reserve channel. In the instance shown the sub-unit 57 is the reserve unit and has therefore not activated its switchable address 63.

To summarize, the invention therefore relates to a system and a method for addressing at least two subscribers 3, 4 that are redundant in respect of each other in a communication network 5, whereby the subscribers 3, 4 are each permanently assigned a first physical address 1, 9 that is unique in the communication network 5. In order to increase the availability of communication connections within the communication network, it is proposed that a group 6 of subscribers 3, 4 that are redundant in respect of each other are each assigned a second physical address 2 that is unique in the communication network 5, whereby the second address 2 assigned to a group 6 can be activated and deactivated respectively as the valid address in the communication network 5 for the redundant subscribers 3, 4 in the group 6, whereby at least one higher-order unit 7 is provided respectively at one time to activate the second address 2 for just one of the redundant subscribers 3, 4 in the group 6 and to deactivate the second address 2 for the remaining redundant subscribers 3, 4 in the group 6.

The invention claimed is:

1. A system, comprising a plurality of subscribers and a higher-order unit, for addressing the subscribers that are redundant in respect of each other in a communication network, wherein
   the subscribers are each permanently assigned a unique physical address in the communication network such that each unique physical address is different for each subscriber, the subscribers forming a group such that the subscribers in the group are redundant in respect to each other, wherein
   the group of subscribers is assigned a unique group address in the communication network such that the unique group address is only activate for one of the subscribers in the group and de-active for each of the remaining subscribers in the group, wherein
   the at least one higher-order unit is provided to activate the unique group address for the one of the subscribers in the group via the unique physical address permanently assigned to the one of the subscribers in the group and to deactivate the unique group address for each of the remaining subscribers in the group via the unique physical address permanently assigned to each of the remaining subscriber,
   wherein each subscriber is addressable individually via its respective unique physical address, and
   wherein the subscribers are addressable as a group via the unique group address.

2. The system according to claim 1, wherein the higher-order unit is provided to identify failure of communication to the subscribers and to identify failure of the subscribers.

3. The system according to claim 2, wherein the higher-order unit is activates provided to select a preferred communication link from the communication links to the subscribers assigned to a group.

4. The system according to claim 1, wherein the system is part of an industrial automation system.

5. The system according to claim 1, wherein the physical addresses are MAC addresses.

6. A method for addressing a plurality of subscribers that are redundant in respect of each other in a communication network, the method comprising:
   assigning to each subscriber a permanent unique physical address in the communication network such that that each unique physical address is different for each subscriber, the plurality of subscribers forming a group;
   assigning to the group a unique group address in the communication network, wherein the unique group address is activated in one of the subscribers in the group and deactivated in the remaining subscribers of the group; and
   via a superordinante unit:
      activating the unique group address for the one of the subscribers in the group, the activating by way of a communication using the unique physical address assigned to the one of the subscribers, and
      deactivating the unique group address for each of the remaining subscribers of the group, the deactivating by way of a communication to each of the remaining subscribers of the group via their respective unique physical address,
   wherein each subscriber is addressable individually via its respective unique physical address, and
   wherein the subscribers are addressable as a group via the unique group address.

7. The method according to claim 6, further comprising by the superordinate unit:
   identifying a communication failure to the subscriber having the active unique group address and in response deactivating the active unique group address in said subscriber via its respective unique physical address and activating the unique group address in one of the remaining subscribers via its respective unique physical address.

8. The method according to claim 7, wherein the method is used in an industrial automation system.

9. The method according to claim 6, wherein the method is used in an industrial automation system.

10. The method according to claim 6, wherein the physical addresses are MAC addresses.

* * * * *